C. DIEHL.
PIPE JOINT.
APPLICATION FILED JULY 29, 1910.
1,006,067.
Patented Oct. 17, 1911.
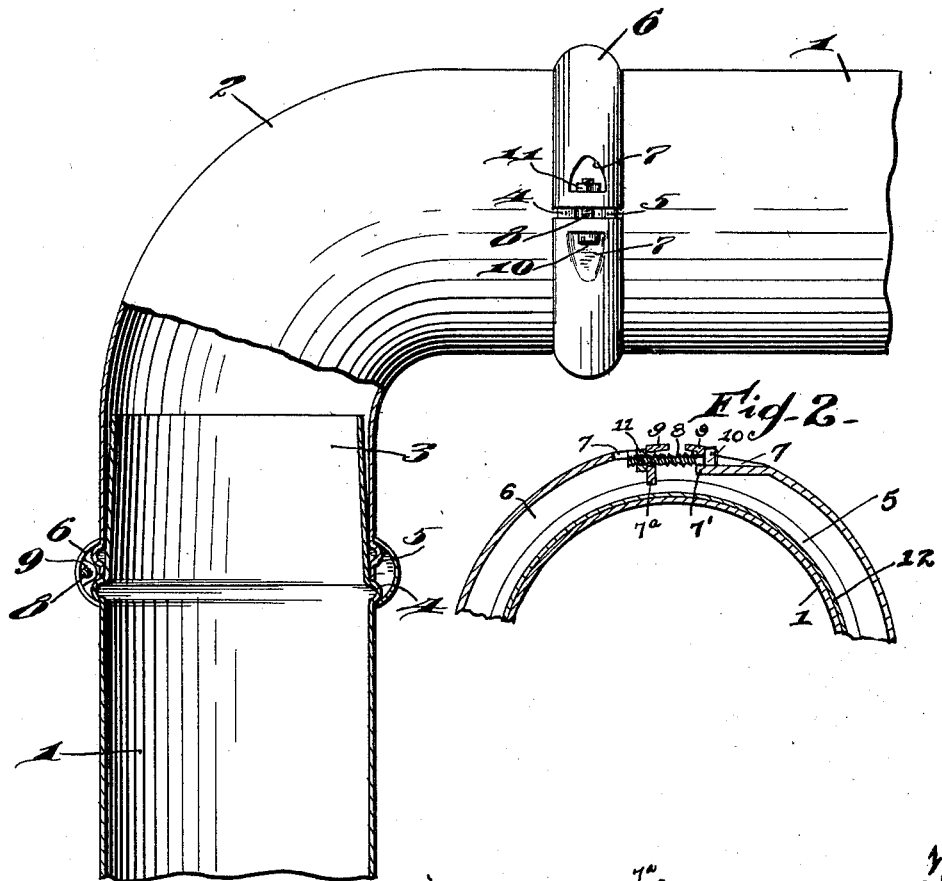

UNITED STATES PATENT OFFICE.

CHARLES DIEHL, OF EGG HARBOR CITY, NEW JERSEY.

PIPE-JOINT.

1,006,067.     Specification of Letters Patent.     Patented Oct. 17, 1911.

Application filed July 29, 1910. Serial No. 574,476.

*To all whom it may concern:*

Be it known that I, CHARLES DIEHL, a citizen of the United States, residing at Egg Harbor City, in the county of Atlantic and State of New Jersey, have invented certain new and useful Improvements in Pipe-Joints, of which the following is a specification.

My invention relates to improvements in pipe joints, and more particularly to an improved construction and mounting for pipes such as stove pipes, heater pipes, water spouts, smoke stacks and the like, in connection with elbows and other forms of joints which insure a perfectly tight joint which cannot spread or come apart.

With these and other objects in view, the invention consists in certain novel features of construction and combinations and arrangements of parts, as will be more fully hereinafter described and pointed out in the claim.

In the accompanying drawings: Figure 1, is a view partly in section and partly in elevation illustrating my improvements in connection with an ordinary stove pipe. Fig. 2, is an enlarged detail view in cross-section through one of the joints. Fig. 3, is a view in perspective of the screw 8. Fig. 4, is a broken enlarged elevation illustrating the manner of securing the split ring around the pipe.

1, represents the sections of smoke pipe and 2 the elbow. Each of these pipe sections 1 and elbow 2 are provided at one end with a tapering or conical reduced portion 3 adapted to telescope in the end of the adjacent section.

Each section, adjacent its reduced portion, is provided with an annular bead 4, while the opposite end of each section is provided with a similar bead 5, so that when the sections are telescoped together, the beads 4 and 5 will come close together and may both be inclosed by my improved split clamping ring 6. The ring 6 is curved or bowed in cross section so as to inclose and confine the beads 4 and 5. This ring 6 is split, and is provided at its ends with recesses or depressions 7 to accommodate a screw 8 which projects through openings 9 formed in the ring. One of the depressions 7 is formed by striking inwardly an ear $7^a$ from the body of the ring adjacent its end, and the other depression is formed by transversely slitting the ring adjacent the other end and bending inwardly the metal on one side of the slit as at 7'. The slit forms an aperture for the bolt to pass through, and the ear $7^a$ is provided with an aperture to receive the bolt. The ear $7^a$ and depression 7' extend into the space between the two beads, so that the bow or curve of the ring 6 need not be increased to admit of this construction. The head 10 of this screw is cut away at one side as illustrated, so as to lie flat against the depressed portion 7' and prevent rotary movement of the screw. On the other end of the screw, a nut 11 is threaded, which bears against the ear $7^a$, and when this nut is turned on the screw, the diameter of the ring will be increased or decreased as desired. By this construction the fastening bolt 8 is entirely within the ring whereby the ring presents a smooth outer surface.

The particular shape of the beads 4, and 5, and of the ring 6 may be varied, it being sufficient that the ring 6 closely confine both of the beads 4 and 5, so that when the ring is tightened around the pipe sections, there can be no independent longitudinal movement of either pipe section, thus overcoming the tendency of the sections to separate, and forming in effect a single rigid pipe at the elbow as well as throughout the straight section.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

Two pipe sections, an annular bead formed on one section adjacent its end, an annular bead formed on the other section at a point appreciably removed from its end, and the end portion of said last mentioned section being reduced in diameter and inserted into the first mentioned section whereby the two beads are arranged in parallelism, and slightly spaced apart, a clamping ring around the sections inclosing both of said beads and engaging the same, said clamping ring being split and curved in cross section to receive said beads, an ear struck inwardly from said ring adjacent one end thereof the ring adjacent the other end being transversely slit and the body of the ring on the side of the slit removed from the end being bent inwardly, a bolt extending through said slit and said ear, a head on said bolt having one side flattened and resting against said inwardly bent portion, and a nut on said bolt and bearing against said ear, substantially as described.

In testimony whereof I have signed my name to this specification in the presence of two subscribing witnesses.

CHARLES DIEHL.

Witnesses:
R. H. KRENKEL,
CHAS. E. POTTS.

Copies of this patent may be obtained for five cents each, by addressing the "Commissioner of Patents, Washington, D. C."